United States Patent [19]

van Loon

[11] Patent Number: 4,503,310
[45] Date of Patent: Mar. 5, 1985

[54] AUTOMATICALLY CONTROLLED ARC-WELDING DEVICE FOR WELDING TIE ELEMENTS TO A WORK PLACE

[75] Inventor: Martien K. C. van Loon, Mierlo, Netherlands

[73] Assignee: Weld-Equip B.V., Helmond, Netherlands

[21] Appl. No.: 474,499

[22] Filed: Mar. 11, 1983

[51] Int. Cl.³ ............................................... B23K 9/20
[52] U.S. Cl. ................................... 219/98; 219/130.21
[58] Field of Search ............ 219/98, 99, 130.1, 130.21

[56] References Cited

U.S. PATENT DOCUMENTS 4,241,285 12/1980 Golonka, Sr. et al. ................ 219/98
4,415,792 11/1983 Jordan .................................... 219/98

FOREIGN PATENT DOCUMENTS

WO82/03033 9/1982 PCT Int'l Appl .................... 219/98

Primary Examiner—Clifford C. Shaw
Attorney, Agent, or Firm—Oblon, Fisher, Spivak, McClelland & Maier

[57] ABSTRACT

An arc welding device for welding tie elements to a work piece includes a welding head for positioning one tie with respect to the welding spot on the work piece and exerting pressure between the tie and the work piece. A control member determines the amount of energy to be dispensed by the energy source to the welding head. A memory stores data indicating the relation between amount of energy dispensed and various welding parameters. A measuring member supplies values for some of the parameters. A measuring member compares the amount of energy actually dispensed with the energy determined by the memory member and readjusts the setting for the energy source as a result of this comparison.

13 Claims, 3 Drawing Figures

AUTOMATICALLY CONTROLLED ARC-WELDING DEVICE FOR WELDING TIE ELEMENTS TO A WORK PLACE

The invention relates to an arc-welding device for welding the elements to a work piece comprising an electric source of energy, a welding head connected to the electric source of energy and having means for receiving at least one tie element, means for positioning the welding face of the tie element with respect to the welding spot on the work piece and means for exerting pressure between the tie element and the work piece, a control-member for determining the energy dispensed by the electric source of energy and an energizing member for establishing an arc-striking circuit between the source of electric energy, the tie element and the work piece.

The presently mostly used arc-welding devices for welding tie elements to a work piece are pin welding devices and bolt welding devices, in which the tie elements employed are termed pins and bolts respectively. The pins and bolts may have different designs and have different welding surfaces or diameters and lengths. Characteristic of the pins is that they are provided at the welding face with an ignition tip arranged preferably at the centre in the direction of the longitudinal axis of the welding surface, the dimensions of the tip being small as compared with the area of the welding face. In the case of bolts the welding face may terminate in a tip for uniform distribution of the welding current along the welding face. However, when a welding cartridge is employed, the welding face of the bolts may be flat. Pin welding and bolt welding are two different techniques, although both are associated with the arc-welding technology.

In pin welding a pin is placed in a welding head which may form part of a welding gun or may be stationary, said welding head comprising means for pressing the pin with the ignition tip on the work piece, for example, a metal sheet. The source of electric energy employed in pin welding comprises a capacitor battery which is charged to a given voltage in dependence on the materials to be welded and, for example, on the surface of the welding face of the pin. After the ignition tip of the pin is brought into mechanical and galvanic contact with the work piece, an energizing switch in the welding head discharges the capacitor battery and a light arc is struck between the welding face of the pin and the co-operative part of the surface of the welding face. The opposite parts of the pin and the work piece fuse and the pin is pressed into the work piece by means in the welding head for exerting pressure between the pin and the work piece so that the weld is established.

In bolt welding the welding face or at least the tip thereof is initially in contact with the work piece and a source of electric energy comprising a rectifier produces a welding current. The welding head comprises means to subsequently draw the bolt upwards from the work piece so that a light arc is struck. In analogy with pin welding the welding head comprises means for pressing the bolt into the work piece after fusion of opposite parts of the bolt and the work piece so that the weld is established. In the abovedescribed mode of bolt welding a ceramic ring is used for defining the weld and for avoiding corrosion.

In a different mode of bolt welding a welding cartridge is used. Initially the bolt, which may be flat on the side opposite the work piece, is provided with a welding cartridge, after which it is brought with the welding cartridge into contact with the work piece so that a distance between the underside of the bolt and the opposite surface of the work piece is defined. Subsequently the welding current is switched on so that a light arc is struck, the shape and size of the welding zone being kept within predetermined limits. After the lower side of the bolt as well as the opposite part of the work piece surface have melted, the bolt is pressed into the work piece and the weld is established.

In both a pin welding and a bolt welding device the tie element is placed in a welding head and the welding head is provided with means for pressing the pin or the bolt into the work piece at an appropriate instant. In the case of the bolt welding device for bolts terminating in a tip and provided with a ceramic ring the welding head is furthermore provided with means for initially moving the bolt with the ceramic ring away from the work piece before pressing the bolt into the work piece at a suitable instant.

Both the pin welding device and the bolt welding device are provided with a source of electric energy and a control-device. In the pin welding device the source of electric energy is provided with a capacitor battery and the control-device comprises setting members to determine to which voltage the capacitor battery has to be charged. In the bolt welding device the source of electric energy comprises, for example, a rectifier for supplying the welding current or voltage and the control-device comprises setting means for adjusting the magnitude of the welding current or welding voltage to be supplied by the source of electric energy and for setting the time during which the welding current or welding voltage has to be supplied by the electric energy source. In both cases the setting of the control-member depends on the surface of the welding face or the diameter of the pin or bolt (as far as referring to in this description the term "welding face" of the bolt is to denote the cross-sectional area of the bolt above the tapering part thereof terminating in a tip), and/or on the composition of the material of the tie element to be welded and/or the composition of the material of the work piece. It is noted, besides, that the welding head may be designed so that it is capable of simultaneously welding a plurality of tie elements to a work piece.

The setting of the respective control-members is, in practice, based on the experience of the operator and to a lesser extent on the instructions obtainable only with difficulty from manufacturers of arc-welding devices and/or tie elements. After having established a first weld, it is visually inspected and often a tension, bending and load test is carried out, which tests are frequently destructive. When the weld is found to be correct, the setting of the control-members remains unmodified, after which many series of welds can be performed in the same manner.

It will be obvious that the process described above cannot guarantee the quality of the job, whilst errors of control cannot be corrected.

Maintaining the setting after visual inspection and tests means neglecting varying welding parameters such as the quality of the contact between the ignition tip of the pin, the corrosion of materials, the position to which the bolt is drawn up above the surface of the work piece. Moreover when welding a series of tie elements the composition of the material should remain the same. In the event of an "erratic" tie element of a different material it will be incorrectly welded, which will not be signalled. It may also occur that the first weld is established under relatively favourable conditions, whereas the conditions for the subsequent welds may be less favourable so that quite a series of inferior welds may be the result.

Dependent on the operator's experience and on circumstances it may furthermore take a long time before a first qualitatively acceptable weld is obtained.

It will finally be obvious that in the case of a plurality of control-knobs error hazards will increase.

The invention has for its object to eliminate at least part of the above-mentioned inconveniences and provides for this purpose an arc-welding device of the kind set forth in the preamble which is characterized in that the arc-welding device furthermore comprises a memory member connected to the control-member, in which memory are stored data indicative of the relationship between the energy to be dispensed by the electric energy source and the diameter or the surface of the welding face and/or the composition of the material of the work piece and/or further welding parameters, a measuring member connected to the control-member for producing signals representative of the diameter or the surface of the welding face and/or the composition of the material of the tie element to be welded and/or the composition of the material of the work piece and/or further welding parameters, searching member connected to the control-member for selecting, in response to the signals of the measuring member in the memory member, the energy to be supplied by the electric energy source and for producing a signal representative of the energy to be dispensed and a setting member connected to the control-member and to the electric energy source for setting the electric energy source in response to the signal of the searching member in a manner such that subsequent to actuation of the energizing member it gives off the energy determined by the memory member.

It is an advantage of the invention that all relevant data relating to the welding parameters are stored in the memory member, for example, a ROM, a PROM or an EPROM, whilst there is provided a measuring member for measuring the actual welding parameters and the welding conditions. The stored information is compared with the measured data and in accordance herewith the electric energy source is controlled. Preferably measuring is carried out also during the welding operation so that the initial setting of the energy source can be re-adjusted during welding. Particularly in bolt welding the time setting thus becomes redundant. In fact, the arc-welding device may be designed as a mono-knob arc-welding device, the single knob constituting the energizing member which may be arranged in the welding head of a welding gun. Further settings are performed automatically.

The arc-welding device embodying the invention may furthermore be provided with an indicating member and/or a blocking member to display or to block respectively the operation of the arc-welding device, when the energy determined by the memory cannot be produced or delivered by the electric energy source and/or when the composition of the material of the work piece and the composition of the material of the tie elements are incompatible with the welding process.

The invention will now be described in detail with reference to the drawing, in which FIG. 1 is a simplified, general block diagram of the arc-welding device embodying the invention.

Figure 1:
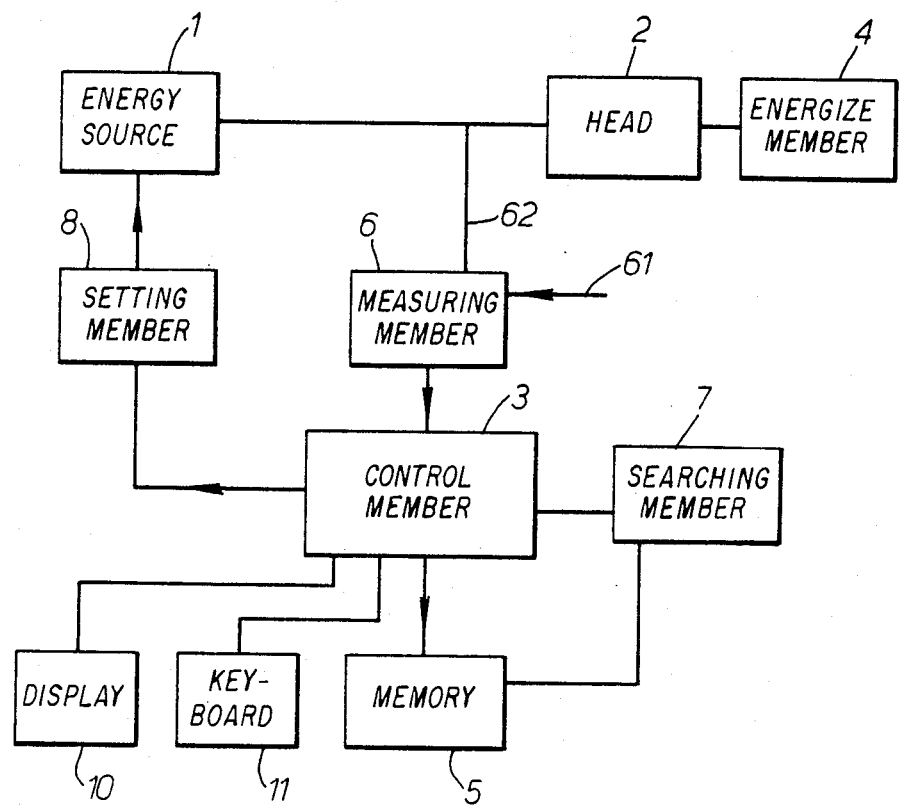
FIG. 1 shows a simplified, general block diagram of the arc-welding device for welding tie elements to a work piece, which may be designed as a pin welding device as well as a bolt welding device. The steps specific for the pin welding device and the bolt welding device respectively required within the block diagram of FIG. 1 will be defined, if necessary, in the further description.

The arc-welding device of FIG. 1 comprises an electric energy source 1, a welding head 2 connected to the electric energy source and provided with means (not shown in FIG. 1) for receiving at least one tie element, that is to say, a pin or a bolt, means (not shown) for positioning the welding face of the tie element with respect to the welding spot on the work piece, that is to say, for bringing the ignition tip of the pin into mechanical and galvanic contact with the surface of the work piece and for initially bringing the tip of the bolt into mechanical and galvanic contact with the surface of the work piece and for subsequently lifting the bolt from the work piece and means (not shown) for exerting pressure between the tie element and the work piece at the appropriate instant, particularly when the lower side of the pin or bolt and the opposite part of the work piece surface have fused under the action of a light arc produced. Reference numeral 3 designates a control-member for determining the energy to be supplied by the electric energy source, that is to say, in the case of a pin welding device, the voltage to which the capacitor battery (not shown) in the electric energy source 1 has to be charged prior to striking a light arc and in the case of a bolt welding device, for determining the welding current or welding voltage to be dispensed by the electric energy source 1 and the duration thereof. For both charging and discharging the capacitor battery in the electric energy source 1 of the pin welding device and for determining the magnitude of the welding current or welding voltage and the duration thereof thyristor circuits are frequently employed. This is, however, not required. In particular bolt welding devices it is preferred to first strike an auxiliary or pilot light arc prior to striking the actual welding arc. This is not required either.

Reference numeral 4 designates an energizing member for generating an arc striking circuit between the electric energy source, the tie element (not shown) and the work piece (not shown). When the welding head forms part of a welding gun, the energizing member 4 is provided in the conventional manner with a pressure head connecting the tie element arranged in the welding head to one pole of the electric energy source, the other pole of which is continuously connected to the work piece.

The control-member 3, which is preferably a microprocessor which may form part of a mini- or microcomputer, for example, a so-called "personal computer" is connected to a memory member 5, for example, a dead memory (ROM), as the case may be, a PROM or an EPROM, whilst the memory member may, of course also be formed by a plurality of ROM's. The memory member 5 is, however, not limited to these embodiments. In accordance with the domain of use of the arc-welding device the memory stores data indicating the relationship between the energy to be dispensed by the electric energy source and the diameter or the surface of the welding face and/or the composition of the material of the tie element to be welded and/or the composition of the material of the work piece and/or further welding parameters. For a pin welding device, in which mainly cylindrical pins are used, the memory can store five data relating to the voltage to which the capacitor battery in the electric energy source has to be charged in dependence on the composition of the material of the pin and the diameter thereof. This will be referred to again hereinafter in the description of FIG. 2. In the case of a bolt welding device data can be stored indicating the relationship between the charging current or the charging voltage and the composition of the material and the diameter of the bolts. This will be referred to hereinafter in the description of FIG. 3.

When furthermore the memory member 5 stores potential and non-potential combinations of material compositions of the work piece and the tie elements, a non-potential combination can be displayed by an indicating or display member 10 or the control-member 3 may interrupt the welding process or not start the process. When welding in itself is not possible due to the energy source employed or the indicating member the display member 10 can specify an energy source suitable for use. This may also be performed when the composition of the material of the work piece and the composition of the material of a tie element to be welded, as far as welding is concerned, are compatible, indeed, but the energy determined by the memory member cannot be produced and/or supplied by the electric energy source employed. The latter, that is to say, the supply may be blocked due to certain welding conditions, for example, corrosion of materials. This may also be displayed for example as an excessive corrosion by the display member. It is furthermore possible, for example, in pin welding, to measure the pressure between the ignition tip and the work piece and to introduce this value as a welding parameter or simply to indicate whether said pressure is not sufficient or excessive. For this purpose a pressure sensor may be arranged in the welding head. It should, therefore, be evident that the charging voltage in the case of a pin welding device and the welding current or welding voltage and/or the duration thereof varying with one or more different welding parameters can be stored in the memory member 5.

Reference numeral 6 designates the measuring member which is connected at its output to the control-member and which comprises an input 61, which receives measuring signals relating to a tie element to be welded and/or the work piece and/or the relationship between the same and an input 62, which receives signals representative of the electric energy dispensed by the electric energy source. Signals at input 61 of the measuring member 6 are, for example, representative of the diameter of a tie element to be welded, the material composition thereof, the material composition of the work piece, the quality of the mechanical and/or galvanic contact between a tie element to be welded and the work piece, the distance between a bolt to be welded and the work piece, and so on. The signals at input 62 may be representative of the discharge voltage supplied by the electric energy source 1, the discharge time, the welding current, the welding voltage, the duration of the welding current, the welding voltage and so on.

Consequently a first function of the measuring member 6 is the reception at input 61 of signals relating to the tie element and the work piece. The control-member 3 is furthermore connected to a searching member 7, a first function of which is selecting, on the basis of the measuring signals at input 61 of the measuring member, in the memory member 5, the associated setting of the electric energy source, which setting is performed by a setting member 8. The searching member may be any of several well-known devices for performing this function. Any addressing device which receives a digital representation of certain parameters and scan through a memory until an address is reached which contains these parameters may be used.

A second function of the measuring member 6 is to receive at input 62 signals being representative of the actually supplied energy from the electric energy source during the welding operation, said measuring member 6 comprising comparing means (not shown) for comparing, during the welding operation, the actually supplied energy from the electric energy source with the energy determined by the memory, whilst said measuring member furthermore comprises re-adjusting means (not shown) for re-adjusting the setting member by means of the control-member in response to the results of the comparing means. In a bolt welding device, for example, the re-adjusting means may shorten or prolong in a suitable manner the duration of, for example, the welding current to be determined by the setting member. It is noted that for the various functions of the measuring member 6 two separate measuring membrs may be used as well.

It is essential that under the action of the control-member 3 and the measuring member 6 first the welding parameters relating to the tie element to be welded and the work piece should be measured and subsequently in co-operation with the searching member, the memory member and the setting member the electric energy source should be set. Then during the welding operation the measuring member measures the energy dispension from the energy source and compares it with the set value and, if necessary, the setting member is re-adjusted so that the calculated energy to be dispensed is, indeed, obtained. Consequently a closed loop system is concerned here.

The control-member may furthermore be connected to a key board 11, by means of which the control-member or else the micro-processor can be programmed and the performance of the programme and/or the control performed by the microprocessor can be visualized and/or influenced.

Hereinafter a specific embodiment will be described for producing signals at input 61 of the measuring member 6.

Figure 2:
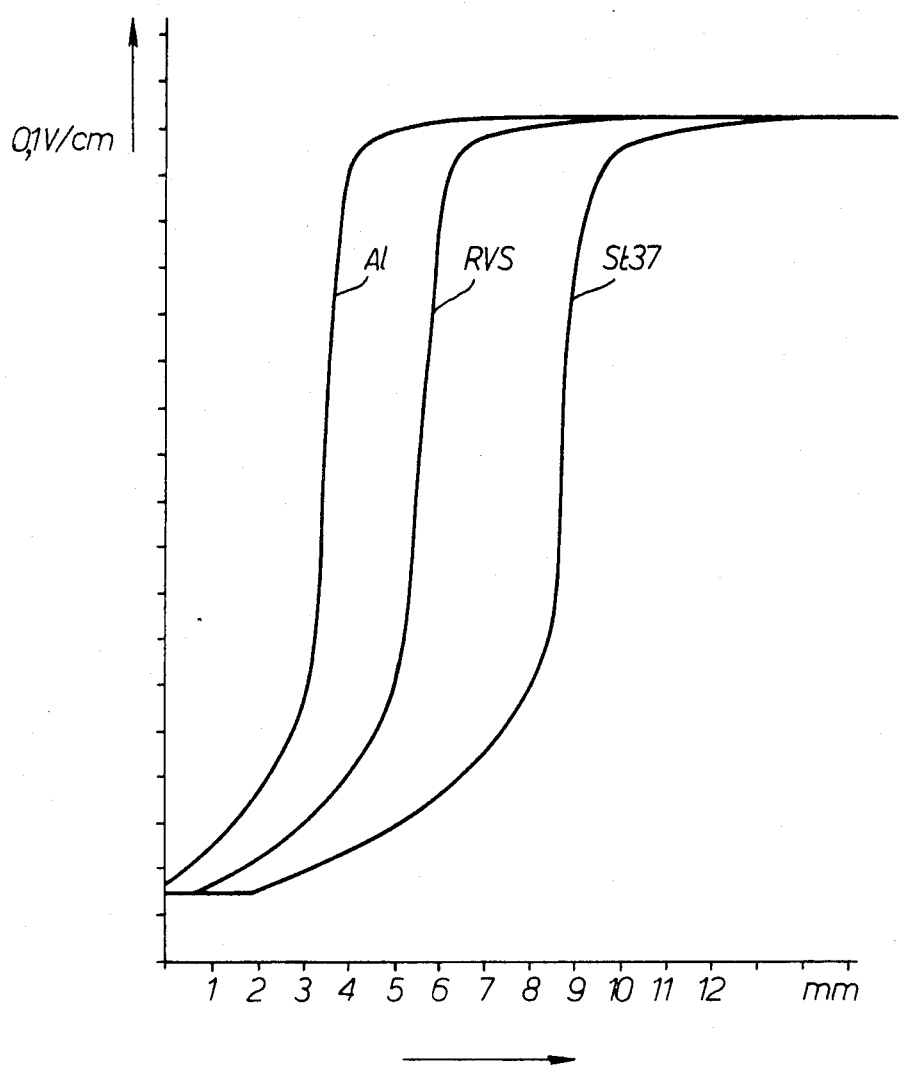
FIG. 2 illustrates the signal variation of an inductive sensor in dependence on the distance from the work piece for various compositions of material of the work piece, when the inductive sensor is perpendicular to the work piece

It is known that the output signal of an inductive approximation circuit, briefly termed inductive sensor, depends on the distance of the inductive sensor from a work piece, particularly a metal work piece. It is furthermore known that this signal variation depends on the composition of the material of the work piece and on the position of the sensor relative to the work piece (see the second quarterly report 1974 of the T.N.O. Metaal Instituut at Apeldoorn). This signal variation is illustrated in FIG. 2 for a perpendicular position of the sensor relative to the work piece and for aluminium (Al), stainles steel (RVS) and steel 37 (St37). If the distance between the inductive sensor and the work piece is maintained constant, for example, 4 mms it is possible by measuring the output signal of the inductive sensor to assess the composition of the material of the work piece, it being noted that the shape of the graphs displayed for the various material compositions may be affected by the definite design of the inductive sensor and the energization thereof. It is thus possible to apply a signal representative of the material composition of the work piece to the input 61 of the measuring member 6. The material composition of the work piece could as well be introduced by means of the keyboard 11, but it is as yet supposed that this is a serious problem for the operators. By positioning the sensor at a fixed distance above the work piece, subsequent to energization of the sensor, a signal representative of the material composition is automatically supplied to the measuring member 6 and in co-operation with the searching member 7 and the memory member 5 the control-member can indicate by means of the indicating or display member 10 whether, for example, a bolt of a given material can be welded to said work piece. For this purpose the input 61 of the measuring member 6 should also receive a signal indicative of the material composition of the bolt. According to the invention said inductive sensor is also used for measuring the composition of the material of the tie elements.

In particular the invention provides a preferably separate holder, which may form in itself part of the welding cap or the welding gun in which an inductive sensor is arranged, said holder being furthermore provided with means for accommodating a tie element and for maintaining a fixed distance between the tie element and the inductive sensor. It might be said that the tie element has taken over the place of the work piece. However, in this case the diameter or the sectional area of the tie element plays a part, when broadly speaking the diameter or the sectional area of the tie element is smaller than the scanned surface of the inductive sensor. In this case, for example, if the tie element is composed of steel 37 the result will not be the single curve of FIG. 2, but a belt of curves will be obtained for the respective diameters or cross-sectional areas of the pins. When combining, however, this inductive scanning of material composition with a diameter assessment providing a signal representative of the diameter of a tie element, for example, by placing an optical diameter sensor in the same holder comprising the inductive sensor, the material composition of the tie element can be unambiguously determined from the signals of these two sensors. For this purpose the signals of the two sensors are applied to the input 61 of the measuring member 6, which may be formed by a plurality of input terminals and by means of the searching member and the memory member first the material composition can be assessed, from which in conjunction with the diameter of the tie element, the charging voltage or current can be derived.

If it is found, for example, that the curves have an unfavourable position for the inductive measuring, the holder may comprise, for example, two inductive sensors which assess the material composition at different, fixed distances between the inductive sensors and each individual tie element or with the aid of one inductive sensor and means fixing in order of succession a constant distance between the tie element and the sensor two inductive measurements may, each time, be carried out.

In practical use of the arc-welding device embodying the invention one tie element of a series of tie elements of the same material and of the same diameter is placed in a preferably separate holder. The holder 6 with the tie element arranged therein or the tie elements held therein then imparts to the measuring member 6 an indication of the material composition and the diameter of the pin. In response thereto the setting member 8 actuates the electric energy source 1. This holder is particularly advantageous when the arc-welding device embodying the invention is a pin welding device. During the welding operation the measuring member can re-adjust through the control-member the setting member 8 in accordance with the closed loop method.

Figure 3:
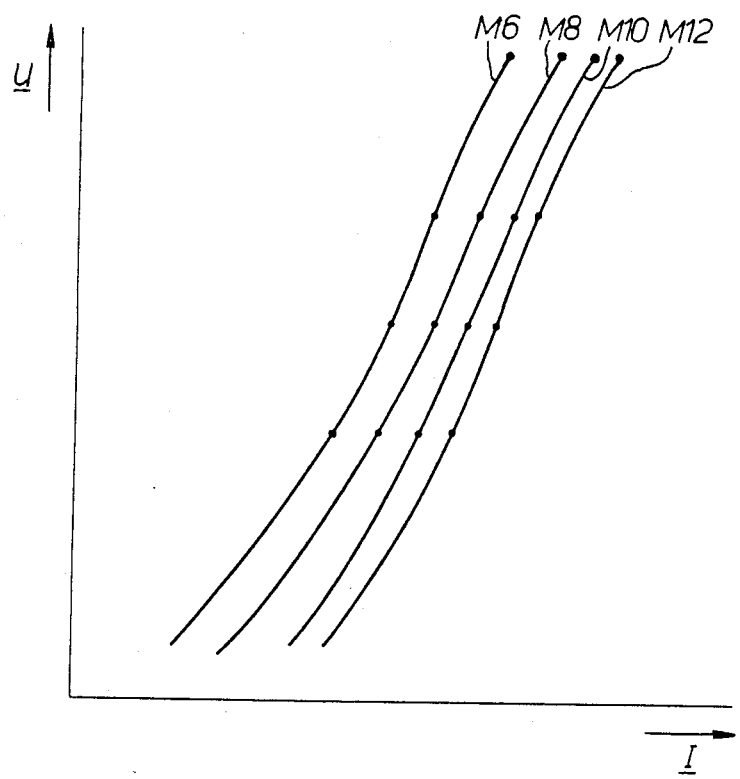
FIG. 3 shows the voltage/current characteristic curves of an electric energy source in dependence on the diameter of a tie element for a bolt welding device.

When the arc-welding device embodying the invention is used as a bolt-welding device, data may be stored in the memory member 5 exhibiting the relationship between the welding current or welding voltage and the material composition and the diameter of the bolts to be welded in the form of the voltage/current characteristic curves of the electric energy source as shown in FIG. 3. It is clearly apparent that these characteristic curves depend on the diameter (where reference is made to the term "diameter" in this description this is to be understood to mean also the cross-sectional area of the bolts). The measuring member then has means for causing the electric energy source 1 to produce a test current or test voltage and then the measuring member measures the voltage or current in response to the test current or test voltage respectively so that the output signal of the measuring member 6 for the searching member 7 is representative of the diameter or the surface of the welding face of a bolt to be welded. These data may again be combined with a measurement of the material composition in a holder of the kind described above, which may furthermore be provided for testing the assessment of the diameter with an optical diameter-assessing circuit.

The test current or test voltage may form part of the welding current or the welding voltage respectively or it may be the current or voltage for producing the control welding arc.

I claim:

1. An arc welding device for welding tie elements to a work piece comprising an electric energy source, a welding head connected to the electric energy source and provided with means for receiving at least one tie element, means for positioning the welding face of the tie element with respect to the welding spot on the work piece and means for exerting pressure between the tie element and the work piece, a control-member for determining the energy to be dispensed by the electric energy source, an energizing member for establishing an arc striking circuit between the electric energy source, a memory member connected to the control-member for storing data indicating the relationship between the energy to be dispensed by the electric energy source and a set of welding parameters, a measuring member connected to the control-member for producing signals representative of said welding parameters, a searching member connecting to the control-member for selecting, in response to the signals of the measuring member, in the memory member the energy to be dispensed by the electric energy sorce and for producing a signal representative of the energy to be dispensed and a setting member connected to the control-member and to the electric energy source for setting, in response to the signal of the search member, the electric energy source in a manner such that subsequent to actuation of the energizing member, said electric energy source gives off an output energy determined by the memory member, said measuring member being connected to said electric energy source so as to determine said output energy and including comparison means for comparing, during the welding operation, the output energy actually supplied with the energy determined by the memory member and readjusting means for readjusting the setting member in response to the result of the comparison by means of the control-member, said memory member storing data representing the voltage/current characteristics of the electric energy source in dependence on the diameter or the surface of the welding face of the tie elements to be welded, said measuring member being provided with means connected through the control-member to the setting member for causing the electric energy source to produce a test current or a test voltage, and said measuring member comprising means connected to the output of the electric energy source for measuring the voltage or current in response to the test current or test voltage respectively, as a result of which the output signal of the measuring member for the searching member is representative of the diameter or the surface of the welding face of a tie element to be welded.

2. An arc-welding device as claimed in claim 1 characterized in that said arc welding device furthermore comprises an indicating member connected to the control-member for indicating that supply of the energy determined by the memory member by the electric energy source is not possible and that the composition of the material of the work piece and the composition of the material of the tie elements, as far as welding is concerned, are not compatible.

3. An arc-welding device as claimed in claim 1 characterized in that it furthermore comprises a blocking member connected to the control-member for blocking the operator of the arc-welding device when the supply of the energy determined by the memory member by the electric energy source is not possible and the composition of the material of the work piece and the composition of the material of the tie elements, as far as welding is concerned, are not compatible.

4. An arc-welding device as claimed in claim 1 characterized in that the test current or test voltage form part of the welding current or welding voltage respectively.

5. An arc-welding device as claimed in claim 1 characterized in that the measuring member comprises at least one holder for receiving at least one tie element, at least one inductive sensor placed in said holder in a manner such that after accommodation of the tie element at least one fixed distance is established between the inductive sensor and the tie element, means connected to said sensor for energizing the inductive sensor and for measuring the response to produce data which is a measure of the composition of the material of the tie element in dependence on the diameter of the tie element and further characterized in that the memory member stores data from said measuring member indicating the relationship between the distance of the sensor from the tie element and the signal response for different material compositions and diameters of the tie elements.

6. An arc-welding device as claimed in claim 1 characterized in that the measuring member comprises an inductive sensor which is arranged so as to co-operate with the surface concerned of the work piece and supplying, upon energization, a signal to said memory member representative of the material composition of the work piece and further characterized in that the memory member stores data indicating the relationship between the distance of the inductive sensor from the work piece and the signal response of different material compositions of the work piece.

7. An arc-welding device as claimed in claim 1 designed for welding tie elements provided at the welding face with an arc ignition extension, said electric energy source being provided with a capacitor battery, with means connected to the setting means for charging the capacitor battery and with means for discharging the capacitor battery, the means for positioning the welding face of the tie element relative to the welding spot on the work piece co-operating with the means for discharging the capacitor battery in a manner such that for discharging the capacitor battery the arc ignition extension is brought into galvanic contact with the work piece, characterized in that the measuring member comprises at least one holder for receiving at least one tie element, at least one inductive sensor placed in said holder in a manner such that after accommodation of a tie element at least one fixed distance between the inductive sensor and the tie element is established, means connected to said sensor for energizing the inductive sensor and for measuring the response to produce data which is a measure for the material composition of the tie element in dependence on the diameter of the tie element and further characterized in that the memory member stores data from said measuring member indicating the relationship between the distance of the sensor from the tie element and the signal response for different material compositions and diameters of the tie elements.

8. An arc-welding device as claimed in claim 7 characterized in that the holder is furthermore provided with means for optically measuring the surface of the welding face or the diameter of the tie element arranged therein.

9. An arc-welding device as claimed in claim 7 or 8 characterized in that the measuring member comprises an inductive sensor arranged so as to co-operate with the surface of the work piece and supplying, upon energization, a signal representative of the material composition of the work piece and in that the memory member stores data indicating the relationship between the distance of the inductive sensor from the work piece and the signal response for different material compositions of the work piece.

10. An arc-welding device as claimed in claim 1 characterized in that the re-adjusting means of the measuring member determine the duration of the welding current or the welding voltage set by the setting member.

11. An arc-welding device as claimed in claim 1 characterized in that the re-adjusting means of the measuring member re-adjust the discharge voltage or discharge current set by the setting member.

12. An arc-welding device as claimed in claim 1 characterized in that the control-member is a microprocessor.

13. An arc-welding device as claimed in claim 12 characterized in that it comprises furthermore a display screen connected to the microprocessor and a key board by means of which the microprocessor can be programmed and the performance of the programme and/or the control can be visualised and/or influenced.

* * * * *